US006643503B1

(12) United States Patent
Phillips

(10) Patent No.: US 6,643,503 B1
(45) Date of Patent: Nov. 4, 2003

(54) WIRELESS SPEAKER FOR RADIO COMMUNICATION DEVICE

(75) Inventor: Sharon E. T. Phillips, Lake in the Hills, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 10/124,466

(22) Filed: Apr. 17, 2002

(51) Int. Cl.[7] .................................................. H04B 1/16

(52) U.S. Cl. .................... 455/340; 455/142; 455/193.1; 455/339

(58) Field of Search .............................. 455/340, 150.1, 455/179.1, 180.1, 188.1, 188.2, 191.1, 191.2, 191.3, 192.2, 192.3, 193.1, 193.2, 193.3, 142

(56) References Cited

U.S. PATENT DOCUMENTS

| | | | | |
|---|---|---|---|---|
| 4,006,290 A | | 2/1977 | Momberger et al. | |
| 4,484,222 A | | 11/1984 | Banach | |
| 5,287,035 A | | 2/1994 | Carroll et al. | |
| 5,553,312 A | * | 9/1996 | Gattey et al. | 455/11.1 |
| 5,758,276 A | * | 5/1998 | Shirakawa et al. | 455/314 |
| 5,917,387 A | | 6/1999 | Rice et al. | |
| 6,070,060 A | | 5/2000 | Edelman | |
| 6,118,882 A | | 9/2000 | Haynes | |
| 6,163,214 A | | 12/2000 | Lam | |
| 6,211,799 B1 | | 4/2001 | Post et al. | |
| 6,212,414 B1 | | 4/2001 | Alameh et al. | |
| RE37,217 E | | 6/2001 | Kobayashi | |

OTHER PUBLICATIONS

Clark–Hess, "Communication Circuits: Analysis and Design", 1994, Kreiger Publishing Corp.

Ash, Darrel L., "SAW–based Hybrid Transceivers in SLAM Packaging with Frequency Range from 200 to 1000 MHz", 1998 IEEE Ultrasonics Symposium, pp. 389–398.

Coon, Allan, "Capabilities and Applications of SAW Coupled–Resonator Filters", RF Monolithics application note AN23, Dec. 1990.

* cited by examiner

*Primary Examiner*—Lee Nguyen
(74) *Attorney, Agent, or Firm*—Brian M. Mancini

(57) ABSTRACT

A wireless speaker apparatus for a radio communication device includes a receiver front end to receive two RF carrier signals with audio information. A tunable filter circuit provides a low side and high side frequency response slope to slope demodulate the carrier frequencies to provide respective amplitude modulated output signals. A control signal tunes a center frequency of the tunable filter circuit to center one of the low or high side frequency response slopes near its associated carrier frequency while decentering the other frequency response slope from its carrier frequency so as to favor demodulation of the former modulated output signals over the latter. An audio back end converts the amplitude modulated output signals to audio. This same simple apparatus can be used for either left or right channel audio signals depending on the control signal.

20 Claims, 6 Drawing Sheets

-PRIOR ART-

-PRIOR ART-

— PRIOR ART —

WIRELESS SPEAKER FOR RADIO COMMUNICATION DEVICE

FIELD OF THE INVENTION

The present invention relates generally to radio communication devices, and more particularly to auxiliary audio devices for radio communication devices.

BACKGROUND OF THE INVENTION

Consumer markets continue to request smaller portable electronic devices that have greater functional features. Examples of such devices include cellular telephones, two-way radiotelephones, broadcast radio receivers (i.e., Walkman®), compact disc players, MP3 players, and computer devices to name but a few. Along with these features, consumers also desire a privacy mode of operation for listening to some of the previously listed audio sources or to provide hands-off operation. Typically, this has meant that a consumer had a wired headset or earbuds that can be connected to a headphone jack of the particular device carrying the source audio.

With the advent of wireless host devices such as cellular phones, the technology is emerging to provide a wireless receiver connection to a headset or earpiece. However, in order to make such wireless receiver comfortable to use, it must also be small and lightweight. Wired devices have met this criterion by only requiring a transducer in the headset or earbud, which is power through the wired by the host device. However, wireless receivers typically require a receiver front end with selection and gain stages, filtering, heterodyne circuits including mixers and local oscillators, audio amplification, and a power source, in addition to the transducer. This can be difficult to miniaturize, not to mention the added costs of these components, and the problem of battery life.

Accordingly, there is a need for a wireless receiver and speaker apparatus that provides an easy-to-use privacy mode of operation. It would also be an advantage to provide a miniaturized receiver with low cost and low power drain. It is also desired to provide an easy way for wireless earbuds to discriminate left and right channel audio information.

DETAILED DESCRIPTION OF THE PREFERRED EMBODIMENTS

Figure 1:
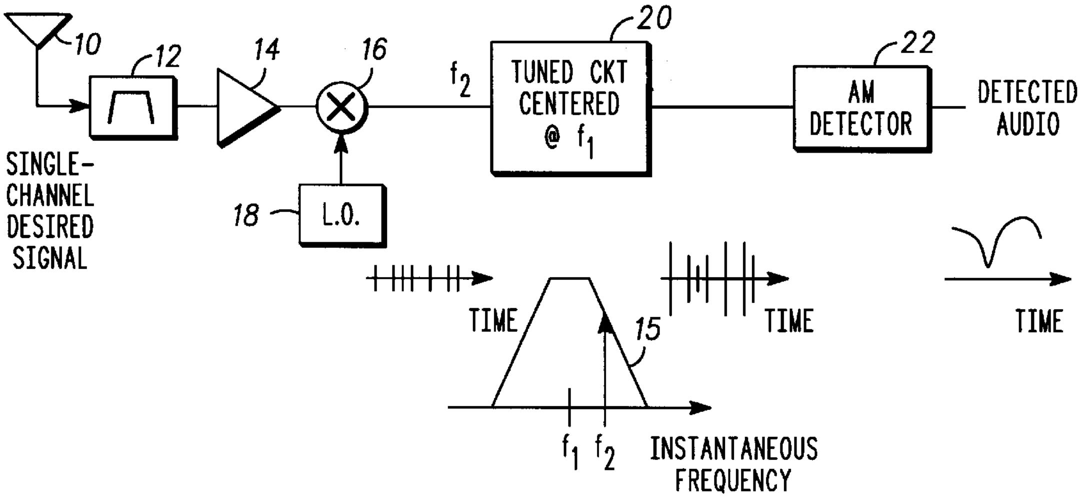
FIG. 1 shows a block diagram of a prior art slope demodulator.

The present invention provides a wireless receiver and speaker apparatus that provides an easy-to-use privacy mode of operation. Advantageously, a detection technique is used that eliminates the need for a mixer and local oscillator or other heterodyne circuitry, thereby providing a miniaturized receiver with a lower cost. Since these parts also use the most current in a receiver, an added benefit is low power drain. The present invention also has the benefit of providing common circuitry in the wireless receiver with reduced complexity such that the same apparatus can be used for either left and right channel audio information.

In particular, the present invention includes a radio receiver capable of detecting one of two equal-level frequency division multiplex (FDM) frequency modulated (FM) signals while rejecting the other. A control signal output determines which of the signals will be detected and which will be rejected. Therefore, different left and right channel receivers need not be inventoried. Instead a pair of identically manufactured circuits can be used, one for the left channel and one for the right channel, for use in a stereo or binaural receiving system.

While the specification concludes with claims defining the features of the invention that are regarded as novel, it is believed that the invention will be better understood from a consideration of the following description in conjunction with the drawing figures, in which like reference numerals are carried forward. Although, the implementation of the embodiments described below is particular to a radiotelephone as a host device to transmit signals to the wireless speaker apparatus, the present invention is applicable to any audio source device with a wireless transmitter.

The radiotelephone portion of the communication device is preferably a cellular radiotelephone adapted for personal communication or personal computing, but may also be a pager, cordless radiotelephone, or a personal communication service (PCS) radiotelephone. The radiotelephone portion may be constructed in accordance with an analog communication standard or a digital communication standard. The radiotelephone portion generally includes a radio frequency (RF) transmitter, a RF receiver, a controller, an antenna, batteries, a duplex filter, a frequency synthesizer, a signal processor, a user interface including at least one of a keypad, control switches, a display, and a microphone, and a wireless transmission interface. The radiotelephone portion can also include a paging receiver. The electronics incorporated into a cellular phone, two-way radio or selective radio receiver, such as a pager, are well known in the art, and may be incorporated into the communication device described below.

FIG. 1 shows a simple block diagram of a prior art heterodyne FM receiver based on a slope demodulator. One or more signals are received by an antenna 10 and processed by a front-end, which includes a preselector filter 12 and gain stage 14. Other components are typically included as are known in the art. The signal is applied to a mixer 16 with local oscillator 18 to convert the signal to an intermediate frequency (IF). To select between two particular desired signals the local oscillator 18 and possibly also the front-end filter 12 adjusts by a frequency amount equal to the difference between the signals. The front-end filter 12 is required to eliminate not just noise but any image signal that falls in the IF due to the action of the mixer 16. The IF portion the receiver is not adjustable in frequency.

The type of detector for the IF signal is referred to as a (single-ended) slope demodulator 20 as is known in the art. The slope demodulator converts a constant-envelope frequency modulated (FM) signal, at $f_2$, to one that has amplitude modulation (AM) in addition to the FM. This is accomplished by processing the signal through a tuned circuit centered at $f_1$ offset from $f_2$. As the signal frequency modulates about $f_2$ on a slope 15 of the transfer function (frequency response) of the filter, an associated AM signal is produced. Typically, the demodulation frequency, $f_2$, is chosen to be centered on the frequency response slope 15 of the filter. The AM signal output from the tuned circuit 20 is detected by an amplitude demodulator 22, which may be of a fairly simple design known in the art, to produce a baseband signal (detected audio) that is subsequently processed and applied to an audio transducer. In practice, the slope of the transfer function of the filter is not linear as shown in the diagram, but instead includes negative, zero, and positive second derivative portions. This results in non-linearities that introduce distortion in the AM signal, wherein larger input signal excursions will produce higher distortion.

Figure 2:
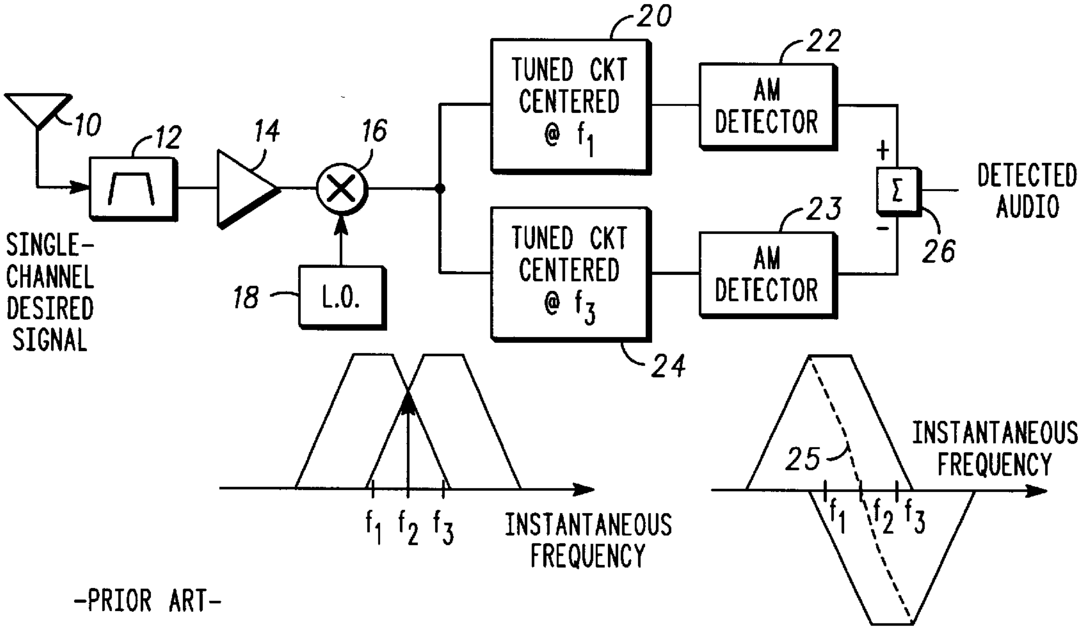
FIG. 2 shows a block diagram of a prior art slope demodulator with improved linearity.

FIG. 2 illustrates a block diagram of a known improvement to the receiver in FIG. 1. To increase linearity a second tuned circuit demodulator 24 and AM detector 23 is added to the system, connected in parallel to the previous slope demodulator 20. The second circuit is centered at $f_3$, a frequency offset from $f_2$ the same amount as $f_1$ is offset from $f_2$, but on the opposite side of $f_2$. The signal from the second tuned circuit 24 and AM detector 23 is subtracted in a summing block 26 from that of the first. This type of circuit is referred to as a "balanced slope demodulator" or "differential slope detector", wherein the curvatures of the frequency responses of the two filter circuits substantially cancel each other to produce a substantially linear response at $f_2$. For simple RLC circuits, this balanced configuration provides a steeper and more linear transfer function 25 that allows for an order-of-magnitude increase in deviation over the single-slope demodulator for similar output linearity. It should be noted that the signal as passed through the lower frequency tuned circuit could have been that which was subtracted from the higher frequency tuned circuit filter with only the sense of the baseband signal inverted.

To receive more than one of a multitude frequency division multiplex signals with the receivers of FIGS. 1 and 2, the front-end of the receiver must include a mixer 16 and a variable tuned or synthesized local oscillator 18 which will have, at minimum, the ability to shift frequency by an amount that is the difference of the desired signals. The oscillator 18 will be tuned in such a way as to put whichever of the signals is the desired one at $f_2$ at the output of the mixer. However, local oscillators have the disadvantage of requiring active circuits that draw current and generally need to be run at a high level to drive the mixer non-linearity. Mixers either have significant loss requiring compensating amplification or they are active themselves. Again, more current is needed to operate these components.

The present invention provides an alternative to the heterodyne receiver architecture of FIGS. 1 and 2 for receiving multiple carriers, by placing either of the slope detectors at RF so as to eliminate the need for a mixer and local oscillator, thereby eliminating the current draw of the heterodyne front-end circuits. Ordinarily, this would mean that a unique detector frequency receiver would be needed for each signal frequency to be detected. In general, this arrangement would be undesirable. However, for the reception of only two signals, such as a stereo or binaural system with only two carriers it can be utilized to advantage as will be explained below.

Figure 3:
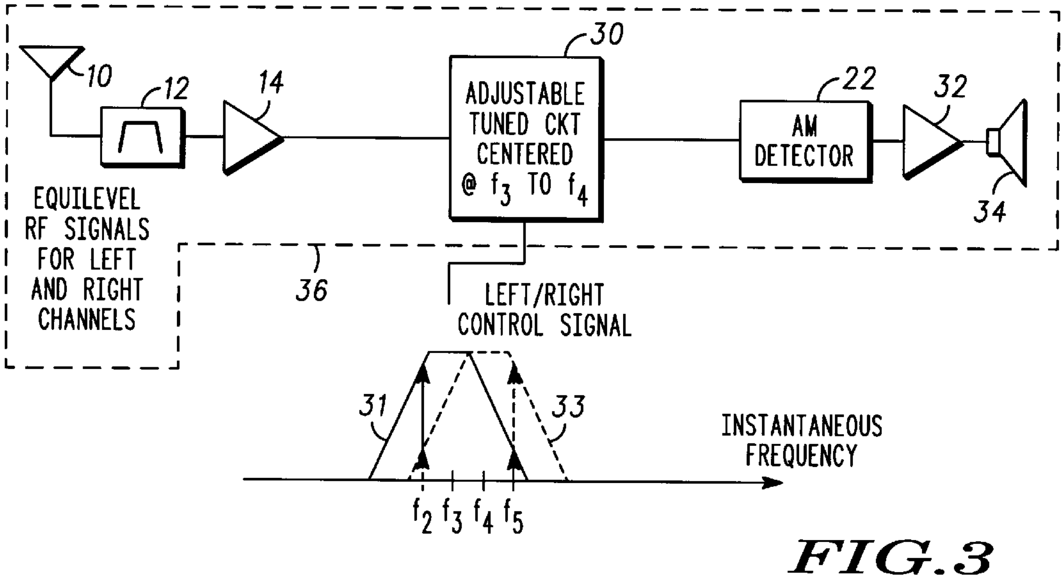
FIG. 3 shows a block diagram of a first embodiment of a wireless speaker with selective control of left and right channel discrimination, in accordance with the present invention.

In FIG. 3 there is illustrated a first embodiment of a wireless speaker apparatus for a radio communication device, in accordance with the present invention. A remote housing 36 includes an electromechanical transducer, or speaker 34, disposed within. The housing can be of any shape or form, and can include one of an earbud, an earpiece, and a headset. It is preferred to be small for comfortable use, such as an earbud to fit within each ear, for example. A receiver is disposed within the housing 36. The receiver is adapted to receive at least two frequency modulated signals carrying audio information, such as modulated RF signals, from the radio communication device. In this way, a one-way wireless link from a radio communication device to the wireless speaker apparatus is provided. Preferably, the radio communication device includes a separate transmitter, apart from its transceiver circuits for communicating with a base station, for transmitting the audio information to the receiver in the housing. The receiver includes circuits that are well known in the art and can include one or more of: printed circuit boards, an antenna 10, RF selection 12, baseband circuitry 22, gain stages 14, 32, electromechanical transducer 34, digital signal processing circuitry, a volume control, and the like.

A novel aspect of the present invention is the use of a single tuned filter circuit to slope demodulated two different signals. This can be of any filter type including an LC circuit, crystal circuit, SAW filter, and the like. In operation, two signals at frequencies $f_2$ and $f_5$ are received. Preferably, these are two, equal signal level RF carrier frequencies. Unlike a heterodyne receivers of FIGS. 1 and 2, the two signals can be demodulated at RF rather than being translated to an intermediate frequency. This eliminates the need for a local oscillator and a mixer with its inherent non-linearities and excessive current drain. A single adjustable passband tuned circuit slope demodulator 30 is used in this embodiment. The tunable filter circuit provides a low side frequency response slope near the first frequency such that filter circuit is operable to slope demodulate the first frequency to provide a first amplitude modulated output signal, and the tunable filter circuit provides a high side frequency response slope near the second frequency such that filter circuit is operable to slope demodulate the second frequency to provide a second amplitude modulated output signal. Unlike the circuit 20 in FIG. 1, this circuit 30 can be adjusted or pulled in frequency by a single control signal applied to the tunable filter circuit to select either one of the two desired signals. The control signal tunes a center frequency of the tunable filter circuit to substantially center one of the low side frequency response slope or high side frequency response slope at the respective first or second frequency while decentering the other frequency response slope from its respective first or second frequency so as to favor demodulation of the one of the carrier frequencies while suppressing the other carrier frequency. Preferably, the control signal can be supplied by a switch operated by a user. In this way, a user can select any wireless speaker apparatus and choose for that apparatus to operate as either a left or right channel stereo receiver.

For example, when the circuit is to be used to demodulate the signal at $f_2$ (left channel for example) the tuned circuit is pulled down in frequency to produce a frequency response 31 (transfer function) that is centered at $f_3$ to provide a high output AM signal at $f_2$, while the signal at $f_5$ (right channel for example) is attenuated by the circuit (demodulated to produce a low output AM signal at $f_5$. When the circuit is to be used to demodulate the signal at $f_5$ the tuned circuit is pulled up in frequency to produce a frequency response 33 (transfer function) that is centered at $f_4$ to provide a high output AM signal at $f_5$, while the signal at $f_2$ is attenuated by the same circuit (demodulated to produce a low output AM signal at $f_2$). For either configuration, the output of the tuned circuit is an AM signal which is demodulated by the audio back end or AM detector 22 coupled to the tunable filter circuit 30. The audio back end converts the amplitude modulated output signals to audio signals for output to a user. A novel aspect of the present invention is that the tuned circuit is adjusted by an amount (f4–f3) which is less than the difference of the two signals (f5–f2) to be received, whereas the oscillator needed to detect two signals by either of the previous methods (FIGS. 1 and 2) needed to be adjusted by the full difference of the two signal frequencies (f5–f2). This narrower tuning range results in an easier and lower-cost filter configuration. In addition, the receiver front-end 12, 14 is optional in the present invention because it is not used for tuning, although front-end gain and wideband filtering can be used. Though not always necessary, an IF configuration can also be provided should it be desirable for filtering of spurious environmental signals.

The slope demodulator of this embodiment has the advantage of its simplicity and low-current draw. In its most basic form, it is a passive filter plus an AM detector. A limitation of this (single-ended) slope demodulator is the linearity at which the tuned circuit can produce AM. The degree of linearity of the slope will determine a maximum FM deviation tolerable for a specified maximum distortion. To improve linearity, the present invention, provides the adjustable filter circuit that is centered at a respective point of maximally linear slope of the filter response for the corresponding carrier frequency. Moreover, the filter circuit is provided with a frequency response that is substantially contained between the first and second frequencies. Such narrow band performance improves linearity and provide a steeper slope for modulation gain.

Figure 4:
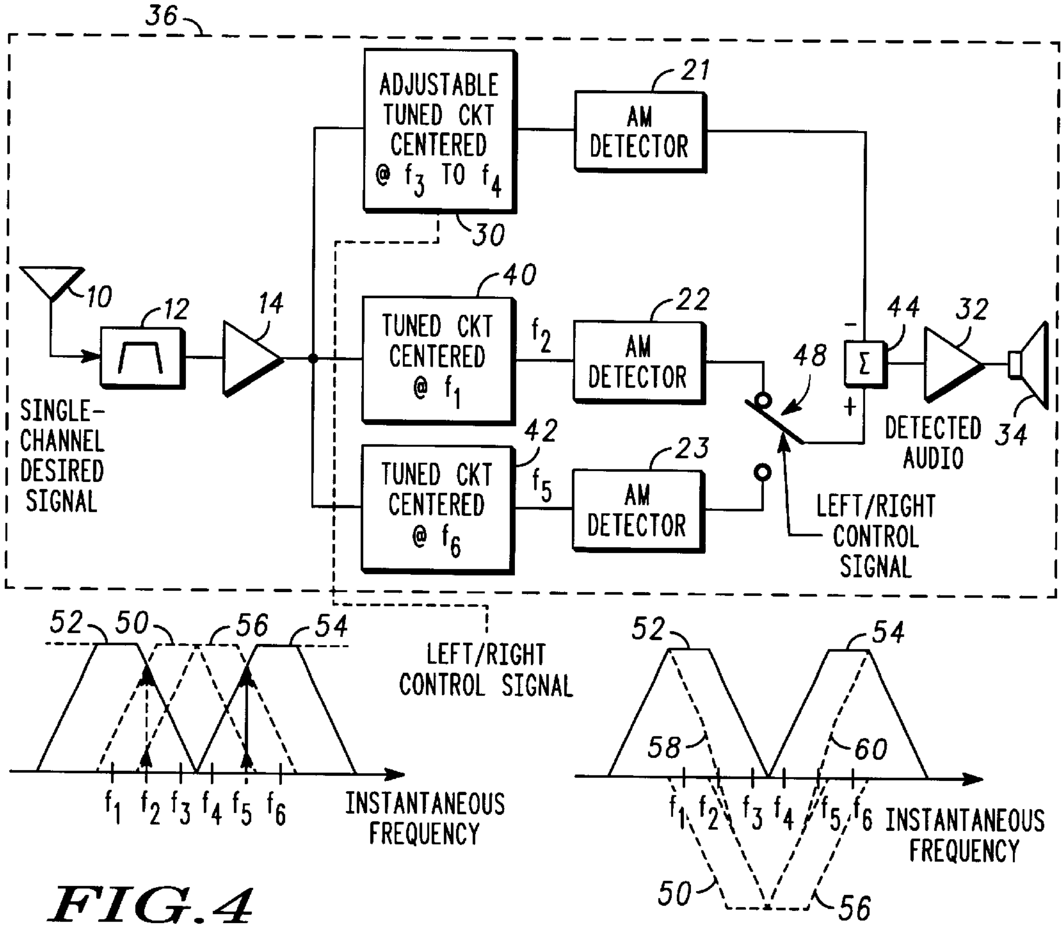
FIG. 4 shows a block diagram of a preferred embodiment of a wireless speaker, with improved linearity and selective control of left and right channel discrimination in accordance with the present invention.

FIG. 4 illustrates a preferred embodiment of the invention that provides a balanced slope demodulator configuration of the apparatus of FIG. 3 and includes all of its advantages. The present invention avoids the use of separate left-channel and right-channel receivers with unique tuned circuit elements that would be required for in left and right earbuds in a stereo or binaural application. In this way, it is not necessary to inventory unique left-ear and right-ear tuning elements. Instead, a common tuning circuit can be used for either the left or right speaker apparatus. In addition, the present invention provides this commonality without doubling the number of filter elements.

In a simpler form, the present invention includes a complementary tunable filter circuit (40 or 42) coupled to the receiver, the complementary tunable filter having a frequency response (52 or 54) with one or more of an upper and a lower slope (i.e. lowpass, highpass, or passband) and a tunable center frequency. The control signal tunes the complementary tunable filter to center one of the slopes of its frequency response on the same frequency centered on a slope of the passband filter 30, with the center frequency of the complementary tunable filter being on the other side of the same frequency from the center frequency of the passband filter. The parallel outputs from the filter circuits are amplitude demodulated and subtracted from each other to obtain an output signal with increased linearity. Optionally, the summing block 44 can be replaced by a differential amplifier.

Preferably, the adjustable tuned circuit 30 of FIG. 3 is combined in parallel with two fixed tuned filter circuits 40, 42 centered at $f_1$ and $f_6$ to selectively detect either the signal at $f_2$ or the signal at $f_5$ with increased linearity. A first of the fixed filter circuits has at least a low pass frequency response (or passband) and a second of the fixed filter circuits has at least a high pass (or passband) frequency response. A control signal, the same as that for FIG. 3, controls the adjustability of the adjustable tuned circuit 30, while also controlling a switch 48 coupled to an output of the parallel amplitude detectors 22, 23. Summing block 44 subtracts the output from the adjustable tuned circuit 30 and amplitude detector 22 circuits from either of the fixed filters 40, 42 and AM detectors 22,23, depending on the position of the switch 48, which provides a signal to summing block 44. Optionally, the summing block 44 can be replaced by a differential amplifier.

In operation, when the circuit is to be used to demodulate the signal at $f_2$ (left channel for example) the tuned circuit is pulled down in frequency by the control signal to produce a frequency response 50 (transfer function) that is centered at $f_3$ to provide a high output AM signal at $f_2$, while the signal at $f_5$ (right channel for example) is attenuated by the circuit (demodulated to produce a low output AM signal at $f_5$). The fixed tuned circuit 40, centered at $f_1$, also provides a frequency response 52 with a low pass slope centered on $f_2$ that, when the response 50 is subtracted therefrom in summing block 44, provides at $f_2$ a more linear response 58 providing balanced-slope demodulation, as described previously. The frequency response 52 can be a low-pass response or a preferred passband response as shown. The signal at $f_5$ will be unbalanced and thus have lower recovery because it falls low on the upper slope of the adjustable tuned circuit response 50 and is thereby attenuated. At the same time, the control signal switches the switch 48 to connect to the sum block 44 providing a difference signal between the AM detectors 21, 21 while disconnecting the tuned circuit 42 with frequency response 54 and AM detector 23 from the output. The function that is depicted as the switch 48 can be provided in multiple ways including passive switch or by selective use of a power to a gain element. The amplitude modulated output is then coupled to the speaker 34 through audio circuitry 32 as previously described.

Similarly, when the circuit is to be used to demodulate the signal at $f_5$ (right channel for example) the tuned circuit is pulled high in frequency by the control signal to produce a frequency response 56 (transfer function) that is centered at $f_4$ to provide a high output AM signal at $f_5$, while the signal at $f_2$ (right channel for example) is attenuated by the circuit (demodulated to produce a low output AM signal at $f_2$). The fixed tuned circuit 42, centered at $f_6$, also provides a frequency response 54 with a high pass slope centered on $f_5$ that, when the response 56 is subtracted therefrom in summing block 44, provides at $f_5$ a more linear response 60 providing balanced-slope demodulation, as described previously. The frequency response 54 can be a high-pass response or a preferred passband response as shown. The signal at $f_2$ will be unbalanced and thus have lower recovery because it falls low on the lower slope of the adjustable tuned circuit response 56 and is thereby attenuated. At the same time, the control signal switches the switch 48 to connect to the sum block 44 providing a difference signal between the AM detectors 21, 23 while disconnecting the tuned circuit 40 with frequency response 52 and AM detector 22 from the output. The amplitude modulated output is then coupled to the speaker 34 through audio circuitry 32 as previously described.

Preferably, all of the tuned circuit filters 30, 40, 42 have passband frequency responses that are substantially the same. Again note that the tuned circuit adjustment requirement, $(f_4-f_3)$, is less than difference in frequency between the two signals, $(f_5-f_2)$. This makes its design easier to accomplish than the adjustable oscillator of the receivers of FIGS. 1 and 2. In addition, combining the adjustable circuit 30 on a substrate with the other tuned circuits 40, 42 allows tracking of environmentally dependent variables and economies of scale in manufacturing. Also important is that the substrate including all three tuned circuits 30, 40, 42 allows a single design to be used in both receivers for the $f_2$ signal and receivers for the $f_5$ signal. This allows for reduced inventories of the circuit. Also, as in the first embodiment, receiver preselector 12 and gain stages 14 are optional because demodulation can occur directly at RF for the wireless audio system.

In the above embodiment, there are references to the centering of a filter response slope at a particular frequency. Because filter responses are typically logarithmic, the prior art typically references centering as the point between the attenuation at the center frequency and the noise floor, on a logarithmic scale. The present invention envisions that the optimum point for centering is at the point of where the slope is most linear, i.e. the maximally linear point. Although this is typically near the classically defined center point, it may not be at that point. Moreover, the maximally linear point may be different between a single-ended slope demodulator (FIG. 3) and balanced slope demodulator (FIG. 4). Therefore, it should be recognized that the references to frequencies $f_2$ and $f_5$ in the above examples may not be the same between the embodiments of FIGS. 3 and 4, even though they can be close to each other. In any case, the present invention is operable in practice for any point near the center of the slope frequency response. Preferably, the present invention does not rely on a fixed setting for the adjustable tuning circuit 30, but can dynamically adjust the tuning of the filter to continually be at its maximally linear point.

Optionally, the demodulator can comprise one or more SAW filters, to take advantage of the periodic nulls of a SAW filter, the common transmit location and thus received power of the left and right channel carriers. The symmetry of differential-slope detector is used to provide a dual-SAW differential-slope detector which will provide good isolation.

Figure 5:
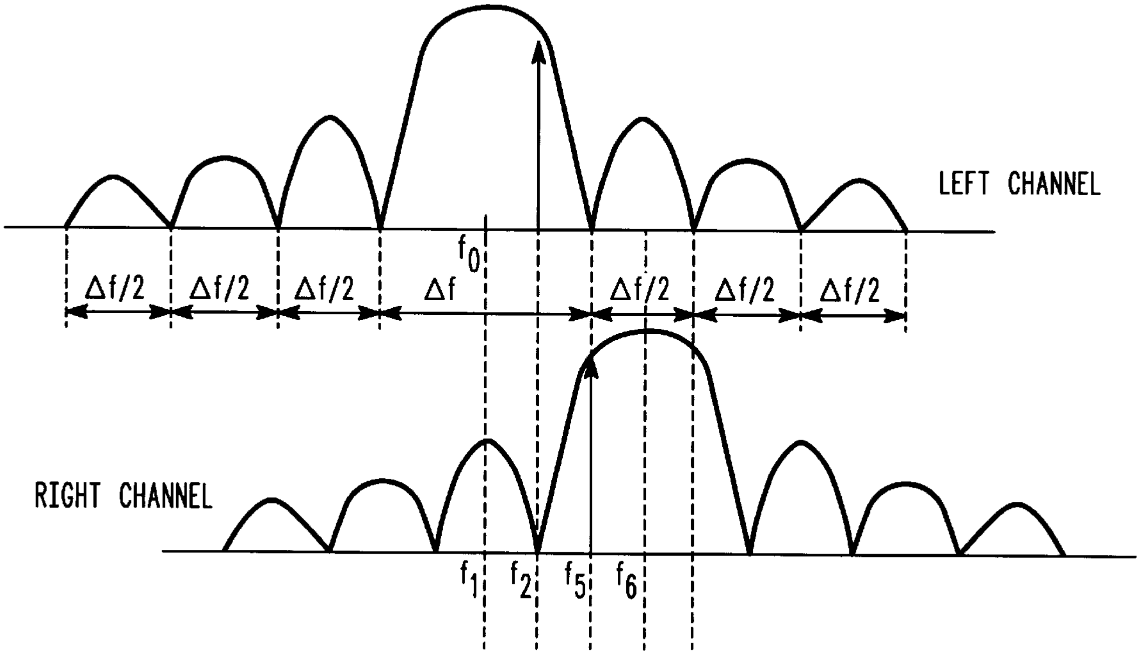
FIG. 5 shows a graphical representation of an alternate embodiment of a SAW filter slope-demodulator, in accordance with the present invention.

FIG. 5 shows a basic inter-digital transducer (IDT) SAW filter characteristic transfer impedance (left channel example) in the form sin 2(x)/x, where x is proportional to (f−fo)/fo and of is the center frequency of the filter. Unlike LC filters this characteristic results in a significant series of transmission zeros spaced Δf/2=N×of apart where N is the number of electrode pairs in the filter. In between the transmission zeros are transmission poles which have lower but significant response for most applications and which require more complicated filter design resulting in increased insertion loss beyond that of the basic IDT SAW filter.

For the communication system of the present invention only two carriers exist and both carriers will be received at comparable levels because they will be transmitted from the same source. One embodiment of the invention is to choose filter parameters or carrier frequency spacing such that one carrier falls in the null of a SAW filter for the other carrier. Here $f_2$ can represent a left-channel carrier and $f_5$ represents a right-channel carrier. A SAW filter centered at $f_1$ converts FM to AM for the carrier at $f_2$ and rejects the carrier at $f_5$. Likewise a SAW filter at centered at $f_6$ converts FM to AM for the carrier at $f_5$ but rejects the carrier at $f_2$. With modest deviation, each carrier can be detected while the other carrier is adequate suppressed. The SAW filter can be tunable, similar to that described for the tunable filter of FIG. 3.

Figure 6:
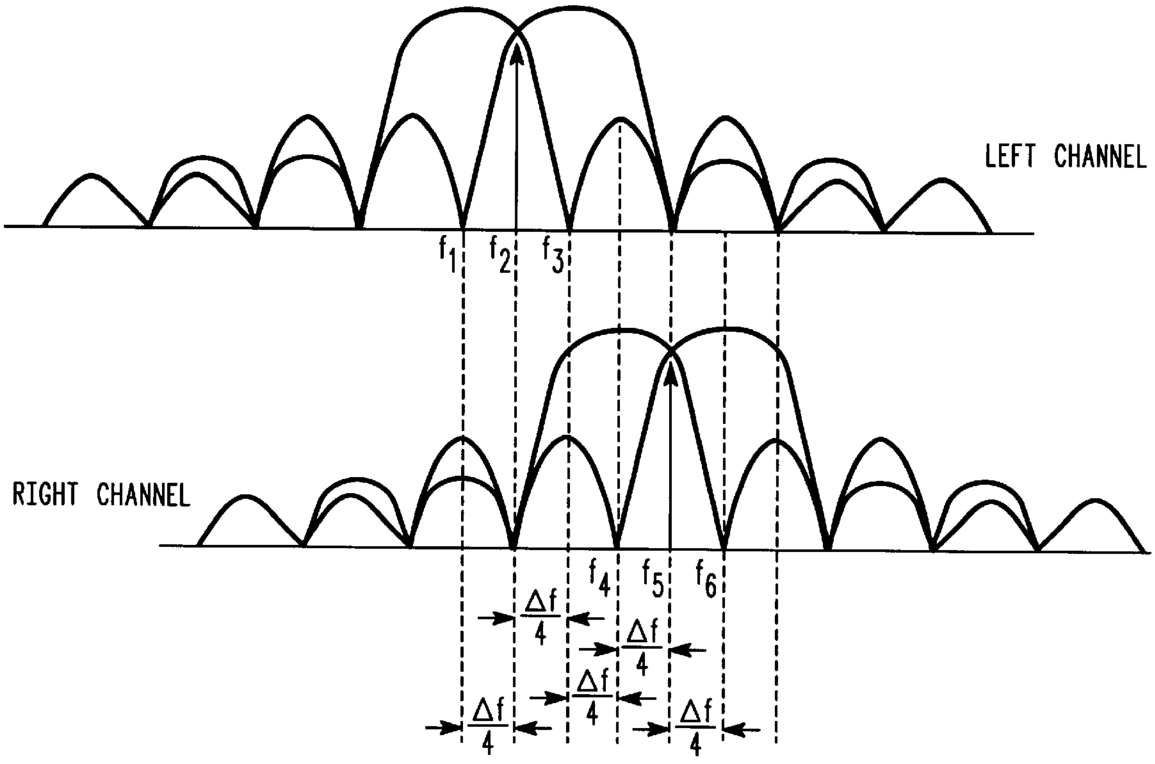
FIG. 6 shows a graphical representation of a balanced version of the embodiment of FIG. 5.

Similar to FIG. 5, a balanced SAW filter demodulator configuration can be used as illustrated in FIG. 6. Each channel is to be demodulated by a differential-slope demodulator as was depicted in FIG. 5. Left and right channel carrier frequencies are represented by $f_2$ and $f_5$ as they were previously. Two IDT SAW filters comprising the detector for the first carrier are spaced Δf/2 apart at $f_1$ and $f_3=f_1+\Delta f/2$, thereby aligning their transmission zeros. The first carrier is placed at the frequency $f_2=f_1+\Delta f/4=f_3-\Delta f/4$ for best symmetry, linearity, and greatest recovered signal level. The second carrier is placed at $f_5=f_1+\Delta f$ putting it in the second upper null of the filter centered at $f_1$, and the first upper null of the filter centered at $f_3$. The two filters comprising the detector of the second carrier are centered at the frequencies $f_4=f_1+(3/4)\Delta f$ and $f_6=f_1+(5/4)\Delta f$. Thus, the first carrier falls in the nulls of both filters of the second carrier detector. As in the previous example, the filter arrangement and carrier spacing of the two-channel differential-slope detector provides attenuation for the undesired carrier which is relatively close to the desired carrier in frequency without putting severe demands on the basic SAW filter design. This is done while providing the desired linearity of differential-slope detection. The SAW filter can be tunable, similar to that described for the tunable filter of FIG. 4.

In an alternate embodiment, the present invention makes use of a novel differential amplifier instead of the summing block (44 in FIG. 4). Unlike the concept of push-pull transistor combining of signals commonly known in differential amplifier design, the present invention uses diode polarity in amplitude (AM) detectors to provide signals which can be combined at a single node to produce a symmetric output.

Figure 7:
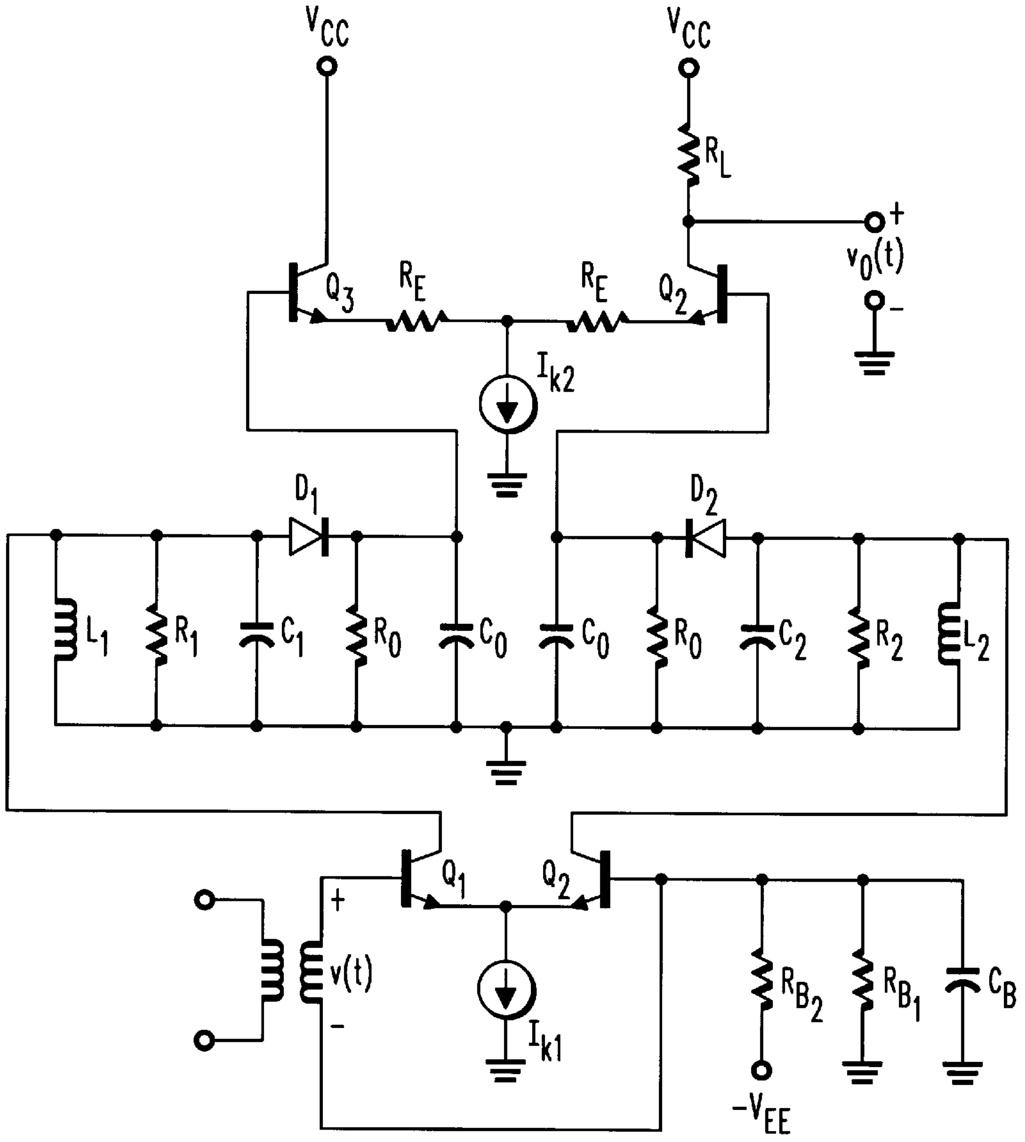
FIG. 7 shows a schematic diagram of a prior art differential amplifier.

FIG. 7 shows a prior art differential amplifier used in traditional differential-slope detectors. The tuned circuit centered at f1 is comprised of components L1, R1 and C1. Diode D1 with an R0, C0 set comprise the AM detector for the f1 signal. The tuned circuit centered at f3 is comprised of components L2, R2, & C2. Diode D2 with a second R0, C0 set comprising the AM detector for the f3 signal. Transistor Q3 and Q4 along with current source Ik2 represent active components in the differential amplifier. In contrast, the present invention does not require the use of an active differential amplifier. Further, a low-voltage power supply (such as 1.2V) would not be adequate to prove the two series diode drops of the D1/Q3 or D2/Q4 combinations. The present invention provides a novel approach to meet these power supply constraints by elimination of the Q3, Q4 transistor pair. Moreover, the present invention provide the polarity reversal normally provided by the Q3, Q4 transistors by reversing the polarity of one of the diodes.

Figure 8:
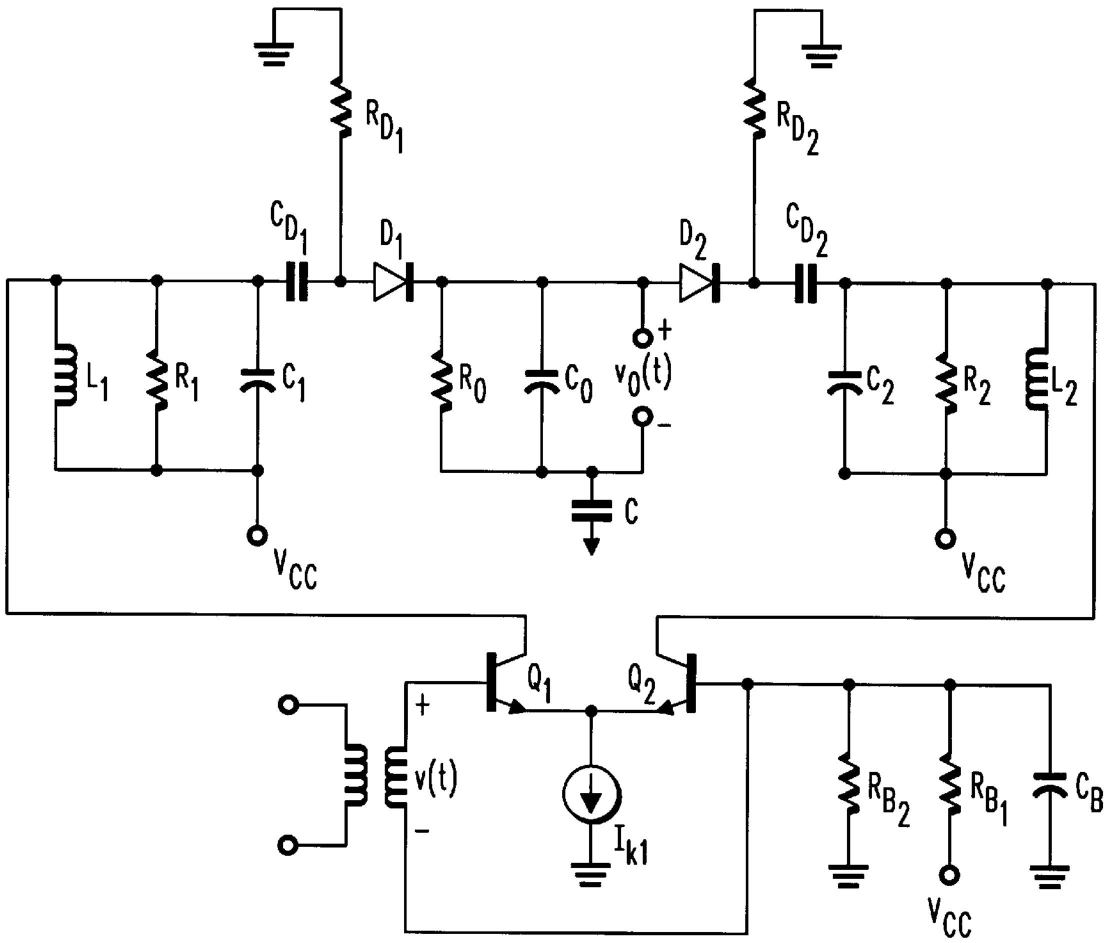
FIG. 8 shows a schematic diagram of a differential amplifier, in accordance with the present invention.
Figure 9:
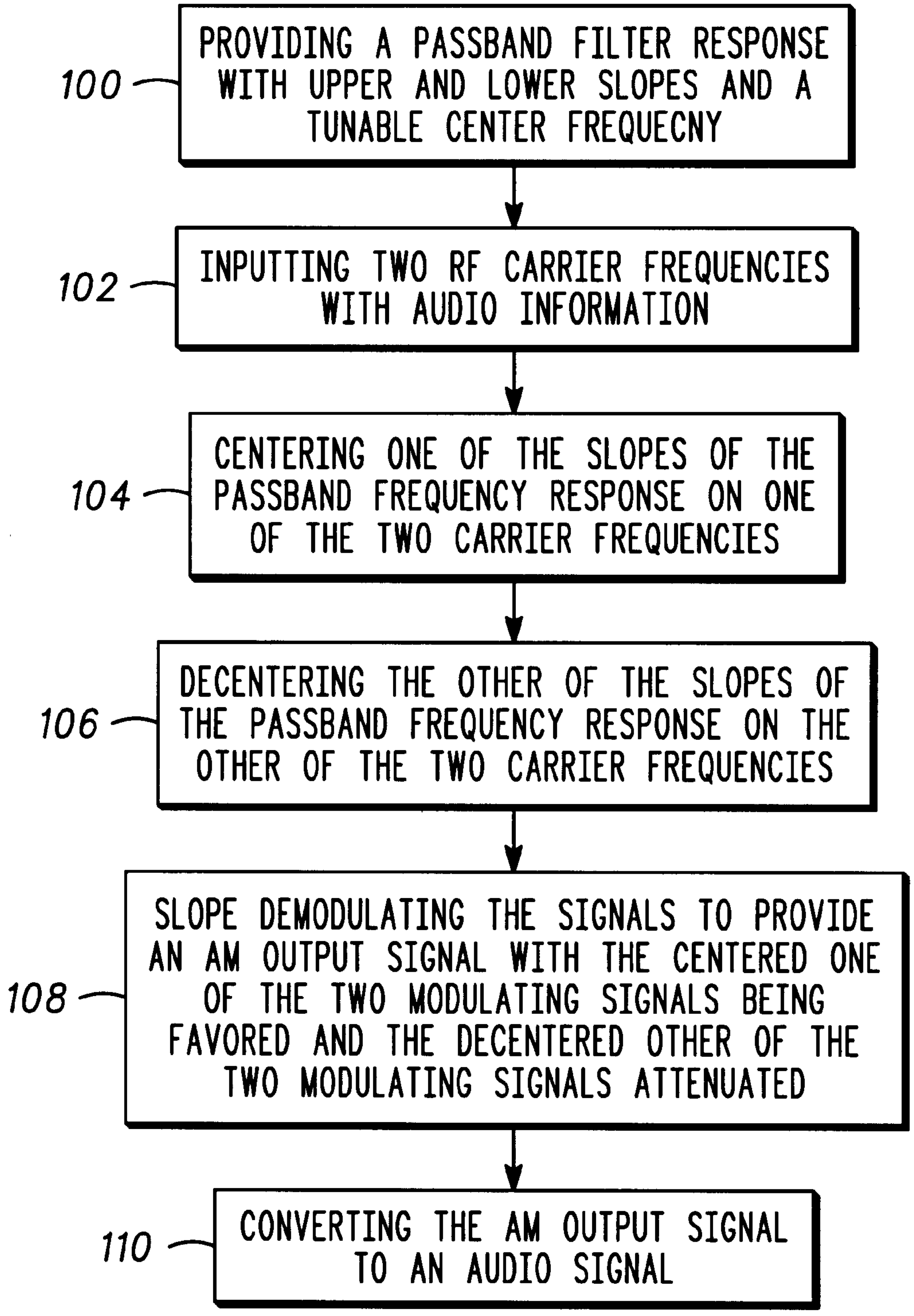
FIG. 9 shows a flow chart of a method in accordance with the present invention.

FIG. 8 shows a differential amplifier AM detector and slope demodulator circuit of the present invention, which combines the differential-slope detection method with envelope detector diodes in a "push-pull" configuration. The diodes require only negligible bias current. The result is a detector output signal which is symmetric and requires no following differential amplifier stage. Preferably, the present invention allows for a discrete implementation using series matched diodes in a single package which have a common anode/cathode connection.

Each of the tuned circuit outputs is AM detected by the diodes D1, D2. The detector outputs are then input to a differential amplifier so that high voltage of the resulting audio signal corresponds to low instantaneous frequency of the input FM signal as having been transferred through the lower tuned circuit. The low voltage of the resulting audio signal corresponds to high instantaneous frequency of the input FM signal as having been transferred through the higher tuned circuit. This results in a significant linearity improvement over the performance of a single-slope detector (or vice versa).

The present invention generates a combined AM detector output for the differential-slope detector which already has the differential sense of high voltage=low frequency and low voltage=high frequency (or vice versa) so that the differential amplifier and its supply needs can be eliminated. Careful inspection of the circuit of FIG. 8 reveals that the detector diodes are not placed in the same sense with regard to the tuned circuit outputs as those of FIG. 7. Instead the diode, $D_1$, corresponding to tuned circuit 1 has its anode on the tuned circuit output and the diode, $D_2$, corresponding to tuned circuit 2 has its cathode placed on the tuned circuit output. The cathode of $D_1$ and the anode of $D_2$ are then connected with a single filtering $R_0$, $C_0$ set. Resistors bias the diodes midpoint between supply and ground and maximize diode sensitivity.

The result of this configuration is as follows: when the instantaneous frequency of the input signal is low, tuned circuit 1 (L1, R1, C1) will have a maximum amplitude response and D1 will conduct significant current on positive cycles charging C0 above half supply. When the instantaneous frequency of the input signal is high, tuned circuit 2 (L2, R2, C2) will have a maximum amplitude response and D2 will conduct significant current on negative cycles discharging C0 below half supply. In this way, the previously used Q3, Q4 differential amplifier and its current been eliminated which allows the RF amplifier to operate under the maximum current available from the supply which increases its gain & improves overall receiver performance. In addition, a series diode configuration available in off-the-shelf packages may be used for matched characteristics of the "push" and "pull" halves of the audio cycle. This would not have been possible without the present invention.

In practice, the communication device can include a charging cradle or holster, to electrically and mechanically couple to at least one of the speaker apparatus when not in use so as to provide battery charging. In particular, the charging cradle or holster has mechanical and electrical contacts for receiving, holding, and charging the housing battery.

The present invention also includes a method of selectively demodulating one of two modulated signals. The method includes a first step 100 of providing a passband filter having a frequency response with upper and lower slopes and a tunable center frequency. Preferably, the response is substantially contained between the carrier frequencies, i.e. narrow band). A next step 102 includes inputting first and second RF carrier frequencies with audio information carried thereon. Preferably, these are frequency modulated RF carrier signals with substantially equal signal levels. A next step 104 includes substantially centering one of the slopes of the frequency response of the filter on one of the two carrier frequencies. Preferably, the centering is at a maximally linear point of the frequency response. Concurrently, a next step 106 includes decentering the other of the slopes of the frequency response of the filter on the other of the two carrier frequencies. A next step 108 includes slope demodulating the signals to provide an amplitude modulated output signal with the centered one of the two modulating signals being favored and the decentered other of the two modulating signals being suppressed. A last step 110 includes converting the amplitude modulated output signal to an audio signal.

Preferably, the providing step 100 includes providing a switch, and wherein the centering and decentering steps 104, 106 are obtained by controlling a center frequency of the passband filter by a control signal associated with the switch. In practice, the switching selects one of a left channel or a right channel audio signal to be provided to a user in the converting step 110.

In one embodiment of the method, to provide balanced slope demodulation, the providing step 100 includes providing a complementary tunable filter having a frequency response with one or more of an upper and a lower slope and a tunable center frequency. The centering step 104 includes substantially centering one of the slopes of the frequency response of the complementary tunable filter on the same one of the two carrier frequencies with the center frequency of the complementary tunable filter being on the other side of the one of the two carrier frequencies from the center frequency of the passband filter. The slope demodulating step 108 includes subtracting a slope demodulated output of the complementary tunable filter from slope demodulated output of the passband filter to obtain an amplitude modulated output signal with increased linearity.

In a preferred embodiment of slope demodulation, the providing step 100 includes providing a first fixed filter with at least a low pass frequency response, and a second fixed filter with at least a high pass frequency response, and the centering step 104 includes substantially centering the low pass slope of the first fixed filter on the first carrier frequency and substantially centering the high pass slope of the second fixed filter on the second carrier frequency, and the slope demodulating step 108 includes subtracting a slope demodulated output of the passband filter from each of the outputs of the fixed filter circuits to obtain an output signal from each with increased linearity, and further comprising the step of selecting one of the amplitude modulated outputs from the fixed filter circuits. Preferably, all the filter circuits in the providing step 100 have passband frequency responses that are substantially the same.

It is to be understood that the phraseology or terminology employed herein is for the purpose of description and not of limitation. Accordingly, the invention is intended to embrace all such alternatives, modifications, equivalents and variations as fall within the broad scope of the appended claims.

What is claimed is:

1. A wireless speaker apparatus for a radio communication device, comprising:

a remote housing;

a receiver disposed within the housing, the receiver operable to receive at least two modulated signals carrying audio information on respective first and second frequencies from the radio communication device;

an adjustable tunable filter circuit coupled with the receiver, the tunable filter circuit provides a low side frequency response slope near the first frequency such that filter circuit is operable to slope demodulate the first frequency to provide a first amplitude modulated output signal, and the tunable filter circuit provides a high side frequency response slope near the second frequency such that filter circuit is operable to slope demodulate the second frequency to provide a second amplitude modulated output signal; and a control signal applied to the tunable filter circuit, the control signal tunes a center frequency of the tunable filter circuit to substantially center one of the low side frequency response slope or high side frequency response slope at the respective first or second frequency while decentering the other frequency response slope from its respective first or second frequency so as to favor demodulation of the one of the carrier frequencies while suppressing the other carrier frequency; and an audio back end coupled to the tunable filter circuit, the audio back end converts the amplitude modulated output signals to audio signals for output to a user.

2. The wireless speaker apparatus of claim 1, wherein the control signal is provided by a switch used to provide one of a left channel or a right channel audio signal to the user.

3. The wireless speaker apparatus of claim 1, wherein the at least two modulated signals have substantially equal signal levels.

4. The wireless speaker apparatus of claim 1, wherein the filter circuit provides a frequency response that is substantially contained between the first and second frequencies.

5. The wireless speaker apparatus of claim 1, wherein the at least two modulated signals are frequency modulated RF carrier frequencies and the carrier frequencies can be tunably centered at a respective point of maximally linear slope of the filter response.

6. The wireless speaker apparatus of claim 1, further comprising a complementary tunable filter circuit coupled to the receiver, the complementary tunable filter having a frequency response with one or more of an upper and a lower slope and a tunable center frequency, the control signal tunes the complementary tunable filter to center one of the slopes of the frequency response of the complementary tunable filter on the same frequency centered on a slope of the passband filter, with the center frequency of the complementary tunable filter being on the other side of the same frequency from the center frequency of the passband filter, wherein the parallel amplitude modulated outputs from the filter circuits are subtracted from each other to obtain an output signal with increased linearity.

7. The wireless speaker apparatus of claim 1, further comprising a first and a second fixed filter circuit coupled in parallel to the adjustable tuned circuit, the first fixed filter circuit having at least a low pass frequency response and the second fixed filter circuit having at least a high pass frequency response, the low pass slope of the first fixed filter being centered on the first frequency and the high pass slope of the second fixed filter being centered on the second frequency, the amplitude modulated output signal is subtracted from each of the amplitude modulated outputs of the fixed filter circuits to obtain an output signal from each with increased linearity, the control signal also controlling a switch selecting between the amplitude modulated outputs.

8. The wireless speaker apparatus of claim 7, wherein all the filters have passband frequency responses that are substantially the same.

9. A wireless speaker apparatus for a radio communication device, comprising:

a remote housing;

a receiver disposed within the housing, the receiver operable to receive two substantially equal level modulated signals carrying audio information on respective first and second RF carrier frequencies from the radio communication device, the first carrier frequency being lower than the second carrier frequency;

a tunable filter circuit coupled with the receiver front end, the tunable filter circuit provides a low side frequency response slope near the first carrier frequency such that filter circuit is operable to slope demodulate the first carrier frequency to provide a first amplitude modulated output signal, and the tunable filter circuit provides a high side frequency response slope near the second carrier frequency such that filter circuit is operable to slope demodulated the second carrier frequency to provide a second amplitude modulated output signal;

a first and a second fixed filter circuit coupled in parallel to the tunable filter circuit to the receiver, the first fixed filter circuit having a frequency response with an upper slope substantially centered near the first carder frequency to provide slope demodulation to produce a first amplitude modulated output signal, the second fixed filter circuit having a frequency response with an lower slope substantially centered near the second carrier frequency to provide slope demodulation to produce a second amplitude modulated output signal, wherein the amplitude modulated output signal from the tunable filter circuit is subtracted from both of the first and second amplitude modulated output signals; and a control signal applied to the tunable filter circuit, the control signal tunes a center frequency of the tunable filter circuit to substantially center one of the low side frequency response slope or high side frequency response slope at its associated carrier frequency while decentering the other frequency response slope from its associated carrier frequency so as to favor demodulation of the one of the carrier frequencies while suppressing the other carrier frequency;

a switch to selectively output one of the respective first and second amplitude demodulated output signals; and an audio back end coupled to the switch to convert the selected amplitude demodulated output signals to an audio signal for output to a user.

10. The wireless speaker apparatus of claim 9, wherein the frequency responses of all the filter circuits are substantially the same.

11. The wireless speaker apparatus of claim 9, wherein the control signal is associated with the switch used to provide one of a left channel or a right channel audio signal to the user.

12. The wireless speaker apparatus of claim 11, wherein the switch is exposed in the housing to allow a user to select the speaker apparatus to operate as one of a left channel or right channel speaker.

13. A method of selectively demodulating one of two modulated signals, the method comprising the steps of:

providing a passband filter having a frequency response with upper and lower slopes and a tunable center frequency;

inputting first and second RF carrier frequencies with audio information carried thereon;

substantially centering one of the slopes of the frequency response of the filter on one of the two carrier frequencies;

decentering the other of the slopes of the frequency response of the filter on the other of the two carrier frequencies;

slope demodulating the signals to provide an amplitude modulated output signal with the centered one of the two modulating signals being favored and the decentered other of the two modulating signals being suppressed; and converting the amplitude modulated output signal to an audio signal.

14. The method of claim 13, wherein the providing step includes providing a switch, and wherein the centering and decentering steps are obtained by controlling a center frequency of the passband filter by a control signal associated with the switch.

15. The method of claim 14, wherein the controlling substep includes selecting one of a left stereo channel or a right stereo channel audio signal to be provided to a user in the converting step.

16. The method of claim 13, wherein the inputting step includes inputting modulated RF carrier signals with substantially equal signal levels.

17. The method of claim 13, wherein the filter of the providing step includes a passband response that is substantially contained between the carrier frequencies.

18. The method of claim 13, wherein the providing step includes providing a complementary tunable filter having a frequency response with one or more of an upper and a lower slope and a tunable center frequency, and the centering step includes substantially centering one of the slopes of the frequency response of the complementary tunable filter on the same one of the two carrier frequencies with the center frequency of the complementary tunable filter being on the other side of the one of the two carrier frequencies from the center frequency of the passband filter, and the slope demodulating step includes subtracting a slope demodulated output of the complementary tunable filter from slope demodulated output of the passband filter to obtain an amplitude demodulated output signal with increased linearity.

19. The method of claim 13, wherein the providing step includes providing a first fixed filter with at least a low pass frequency response, and a second fixed filter with at least a high pass frequency response, and the centering step includes substantially centering the low pass slope of the first fixed filter on the first carrier frequency and substantially centering the high pass slope of the second fixed filter on the second carrier frequency, and the slope demodulating step includes subtracting a slope demodulated output of the passband filter from each of the outputs of the fixed filter circuits to obtain an amplitude demodulated output signal from each with increased linearity, and further comprising the step of selecting one of the amplitude demodulated outputs from the fixed filter circuits.

20. The method of claim 19, wherein die filters in the providing step all have passband frequency responses that are substantially the same.

* * * * *

UNITED STATES PATENT AND TRADEMARK OFFICE

CERTIFICATE OF CORRECTION

PATENT NO. : 6,643,503 B1 
DATED : November 4, 2003
INVENTOR(S) : Phillips

It is certified that error appears in the above-identified patent and that said Letters Patent is hereby corrected as shown below:

Column 12,
Line 5, reads "demodulated", should read -- demodulate --
Line 11, reads "carder", should read -- carrier --
Line 14, reads "an lower", should read -- a lower --

Column 14,
Line 21, reads "wherein die", should read -- wherein the --

Signed and Sealed this

Second Day of March, 2004

JON W. DUDAS
*Acting Director of the United States Patent and Trademark Office*